No. 809,720. PATENTED JAN. 9, 1906.
P. MUELLER.
BASIN COCK.
APPLICATION FILED MAY 29, 1905.

Witnesses
Ina Graham.
Ivy Scherer.

Inventor.
Philip Mueller.
by L. P. Graham
his attorney.

UNITED STATES PATENT OFFICE.

PHILIP MUELLER, OF DECATUR, ILLINOIS, ASSIGNOR TO H. MUELLER MANUFACTURING COMPANY, OF DECATUR, ILLINOIS, A CORPORATION OF ILLINOIS.

BASIN-COCK.

No. 809,720.   Specification of Letters Patent.   Patented Jan. 9, 1906.

Application filed May 29, 1905. Serial No. 262,908.

*To all whom it may concern:*

Be it known that I, PHILIP MUELLER, of the city of Decatur, county of Macon, and State of Illinois, have invented certain new and useful Improvements in Basin-Cocks, of which the following is a specification.

The object of this invention is to facilitate the attachment of basin-cocks to slabs with the nozzles or spouts presented in proper direction, and the invention is applicable to slabs of all kinds having holes of all shapes.

The invention is exemplified in the structure hereinafter described, and it is defined in the appended claims.

Figure 1:
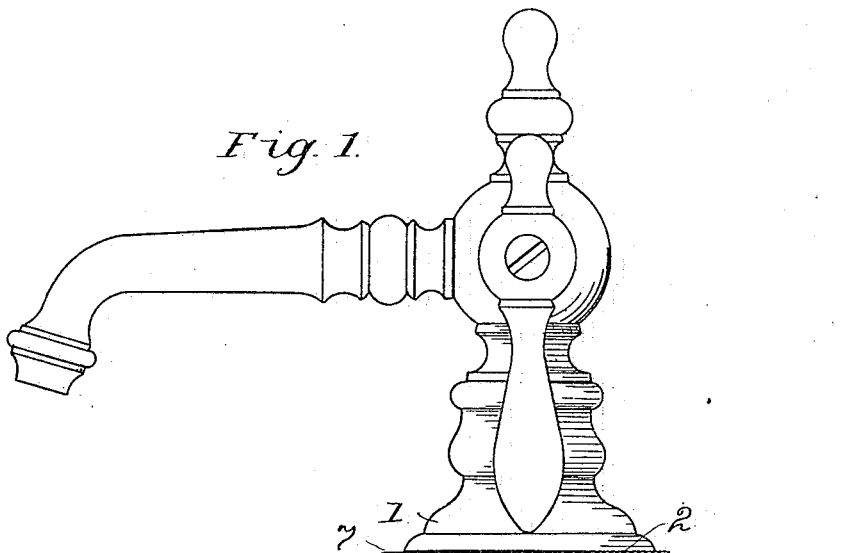
Figure 3:
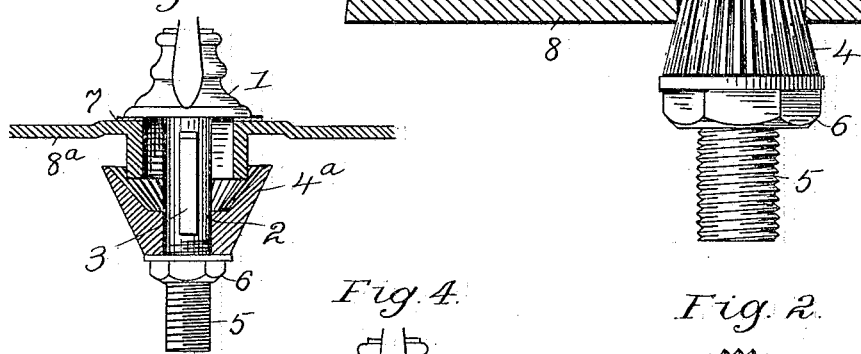
Figure 4:
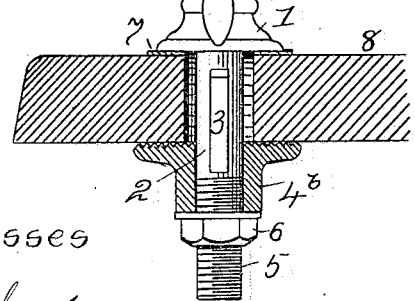
Figure 2:
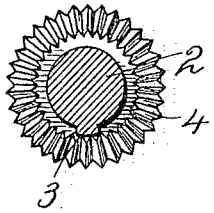

In the drawings forming part of this specification, Figure 1 is an elevation of a cock secured to a slab by means of my improvement. Fig. 2 is a diagram of the securing-washer looking downward from the sectional line X in Fig. 1. Figs. 3 and 4 are details of modifications of the invention.

The base of a cock is shown at 1, the part of the cock that extends through the slab is shown at 2, and the threaded end below the slab is shown at 5. The extension 2 is provided with a longitudinal external rib 3, and the washer 4 is grooved internally to conform to the rib. The washer is ribbed, fluted, corrugated, or roughened on the surface that contacts with the sides of the hole through the slab, and the external surface of the washer may be varied to suit different requirements. In Fig. 1 the washer is in the form of a frustum of a cone, in Fig. 3 the form is that of an inverted frustum of a cone with the bearing-surface depressed and corrugated, and in Fig. 4 the bearing-surface is flat. A nut 6 is screwed onto the threaded end 5 of the cock extension, and it is used to force the washer into contact with the slab. A rubber gasket 7 is preferably inserted between the slab and the base of the cock. In Figs. 1 and 4 the slab 8 is supposed to be made of marble. In Fig. 3 the slab is assumed to be made of iron with porcelain finish, and the metal surrounding the hole through slab 8ª projects downward in the form of a boss. In Fig. 3 the washer is given the reference-numeral 4ª, and the modified washer in Fig. 4 is designated by reference-numeral 4ᵇ.

In attaching the cock to a slab the nut and washer are removed, the extension is inserted through the hole in the slab, the washer is slipped up onto the extension 2 and into contact with the under side of the slab, and the nut 6 is screwed up against the washer with sufficient force to cause the ribs, corrugations, or salient parts of the bearing-surface of the washer to become somewhat embedded into the surface of the slab. The holes through slabs are never precisely accurate. They are usually square, and when a circular form is approached the circularity is never perfect. Consequently the salient parts of the bearing-surface of the washer will ordinarily find depressions sufficient to preclude rotation of the washer when the nut is tightened; but in any event the washer may be forced into contact with the slab with sufficient force to make a firm non-rotative connection and the rib 3 will hold the cock against turning in the washer. The rib 3 prevents rotation of the washer on extension 2, while permitting free longitudinal motion of the washer on the extension, and this is the desired condition regardless of the specific construction employed. The extension 2 may be square in cross-section or any other form except circular, and the rib 3 is intended to be typical of non-circularity in the extension.

What I claim as new, and desire to secure by Letters Patent, is—

1. In a basin-cock, a base to sit on the slab, a longitudinally-ribbed extension to pass through the hole of the slab, a threaded end of the ribbed extension, a washer conforming to the ribbed extension and having a corrugated or roughened bearing-surface, and a nut for the theaded end of the extension.

2. In a basin-cock, a base to sit on the slab, a longitudinally-ribbed extension to pass through the hole of the slab, a threaded end of the ribbed extension, a conical, fluted washer conforming to the ribbed extension, and a nut for the threaded end of the extension.

In testimony whereof I sign my name in the presence of two subscribing witnesses.

PHILIP MUELLER.

Witnesses:
JOHN L. WADDELL,
ANNA MURPHY.